United States Patent [19]
Fukino

[11] Patent Number: 5,025,725
[45] Date of Patent: Jun. 25, 1991

[54] DOUBLE PAPER CUT SYSTEM FOR PRINTER MECHANISM

[75] Inventor: Hiroshi Fukino, Palos Verdes Estates, Calif.

[73] Assignee: Seiko Instruments, Inc., Torrance, Calif.

[21] Appl. No.: 384,176

[22] Filed: Jul. 21, 1989

[51] Int. Cl.$^5$ .............................................. B41F 13/56
[52] U.S. Cl. ................................. 101/227; 101/224; 101/226
[58] Field of Search .................... 101/224, 226, 227; 400/582, 583, 621

[56] References Cited

U.S. PATENT DOCUMENTS

| | | | |
|---|---|---|---|
| 2,930,318 | 3/1960 | Stroud | 101/224 |
| 4,590,859 | 5/1986 | Pou et al. | 101/227 |
| 4,593,893 | 6/1986 | Suter | 101/226 |
| 4,701,063 | 10/1987 | Wysk et al. | 101/226 |
| 4,840,506 | 6/1989 | Kashiwagi | 101/226 |

FOREIGN PATENT DOCUMENTS

223405  5/1987  European Pat. Off. ............ 101/227

Primary Examiner—Edgar S. Burr
Assistant Examiner—Ren Yan
Attorney, Agent, or Firm—Spensley Horn Jubas & Lubitz

[57] ABSTRACT

A paper cutting system for use with printer mechanisms, and more particularly to an apparatus and method for double cutting paper in a printer to trim the final output paper to a standard length. The invention provides an economical means for printing a full-size image on a standard length output sheet from a roll of paper by initially setting the length of the output sheet to the desired standard length plus the length of the necessary leading margin. After the image is printed full-size on the extra-length output sheet, the output sheet is advanced forward out of the printer and cut a first time by the printer's paper trimmer to crop the leading margin of the output sheet. The output sheet is then advanced forward again and cut a second time to crop the output sheet to the desired standard length size.

4 Claims, 2 Drawing Sheets

DOUBLE PAPER CUT SYSTEM FOR PRINTER MECHANISM

BACKGROUND OF THE INVENTION

1. Field of the Invention

The invention relates to a paper cutting system for use with printer mechanisms, and more particularly to an apparatus and method for double cutting paper in a printer to trim the final output paper to a standard length.

2. Background Information.

A number of printers print an image by repeatedly moving a sheet of paper forward and backward past a printing mechanism. For example, color thermal transfer printers typically transfer a color image from a plurality of ink sheets onto an output sheet from a roll of paper, which is then cut to size by an integral paper trimmer after the imaging process is completed. Thus, an output sheet from a roll of paper is moved forward and backward past three or four colors (cyan, yellow, magenta, and optionally black) of ink sheet as the various colored images are formed. For all known printers, this procedure requires an extra forward extension, or margin, at the leading edge of the output sheet (forward of the imaging area) in order for the paper transport mechanism to firmly and reliably hold the output sheet in close registration for each printing pass.

A problem with requiring this leading margin is that the output sheet of paper is usually of non-standard length (i.e., not 8½ × 11 or 8½ × 14 inches) because of the leading margin. In the past, some printers have overcome this problem, and printed standard length output sheets, by reducing the size of the printed image shorter length of paper, thus providing enough leading margin for proper operation of the paper transport mechanism.

FIG. 1a shows an output sheet 1 printed in accordance with the prior art. The image area 2 is reduced both in length and width in order to maintain the aspect ratio of the original image. The smaller image size thus results in loss of image resolution and detail. In addition, this technique requires substantial computational complexity, in extra circuitry or software or both, to reduce a full-size image to a smaller size.

It is therefore desirable to provide a standard length output sheet from such a printer without sacrificing the size of the image area. The present invention economically accomplishes this goal and permits printing a full-size image on a standard length output sheet.

SUMMARY OF THE INVENTION

The inventive apparatus and method provides a means for printing a full-size image on a standard length output sheet from a roll of paper by initially setting the length of the output sheet to the desired standard length plus the length of the necessary leading margin. After the image is printed full-size on the extra-length output sheet, the output sheet is advanced forward out of the printer and cut a first time by the printer's paper trimmer to crop the leading margin of the output sheet. The output sheet is then advanced forward again and cut a second time to crop the output sheet to the desired standard length size The result is a full-size image on a standard length output sheet.

Further aspects of the present invention will become apparent from the following detailed description when considered in conjunction with the accompanying drawings. It should be understood, however, that the detailed description and the specific examples, while representing the preferred embodiment and several alternative embodiments of the invention, are given by way of illustration only.

BRIEF DESCRIPTION OF THE DRAWINGS

Like reference characters in the various drawings refer to like elements.

DETAILED DESCRIPTION OF THE INVENTION

The following description is of the best presently contemplated mode of carrying out the invention. This description is made for the purpose of illustrating the general principles of the invention and should not be taken in a limiting sense.

The invention is described as being used with a color thermal transfer printer (for example, a Seiko Instruments, Inc. Model CH-5500 Color Thermal Printer). However, the invention has application to a wide variety of other types of printers, including single pass and multi-pass types.

Such printers typically incorporate a printing mechanism, an integral paper trimming mechanism, a paper transport mechanism, and electronic control means for controlling the advancement, rewind (if necessary), and trimming of output sheets from a roll of paper. Such control means typically are programmed to advance an output sheet to a standard length and actuate the paper trimming mechanism to crop the output sheet at that length.

Figure 1A:
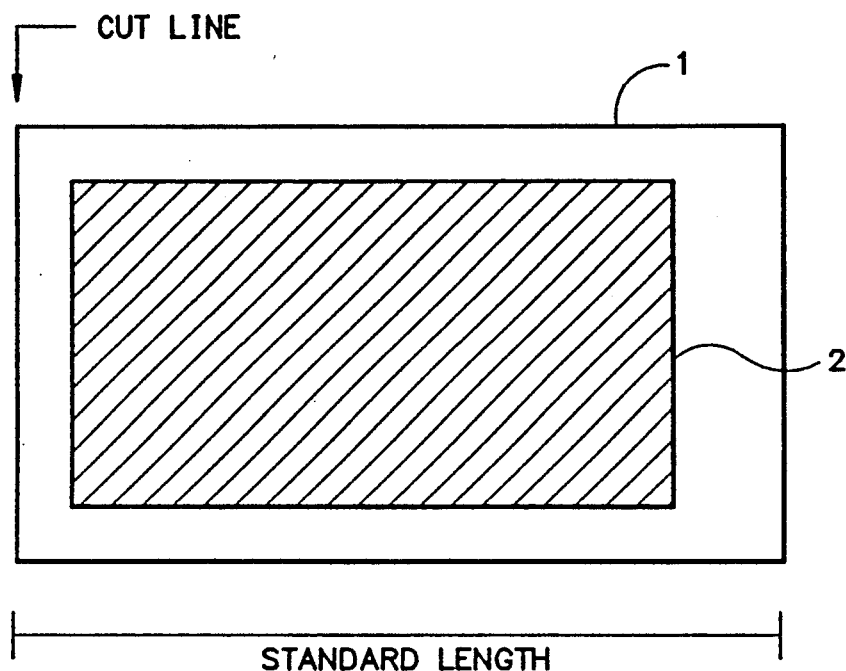
FIG. 1a shows a plan view of a prior art output sheet, showing the reduced image area of the prior art.
Figure 1B:
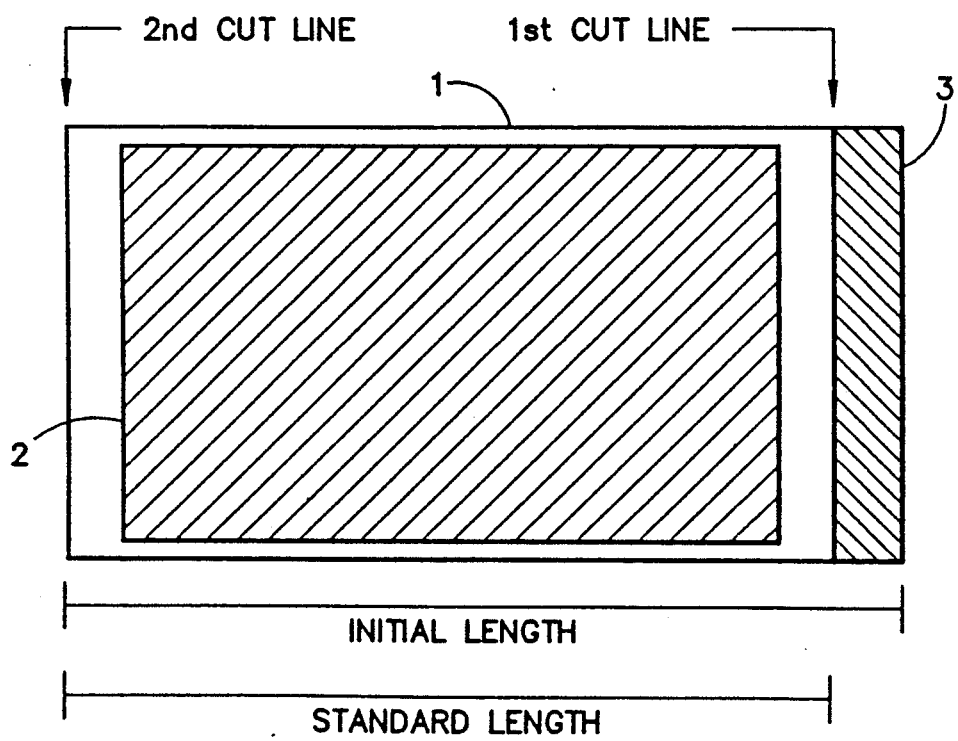
FIG. 1b shows a plan view of an initial output sheet, marked to indicate where it would be cut in accordance with the practice of the invention and showing a full-sized image area.

FIG. 1b illustrates the basic principle of the present invention. An output sheet 1 is initially defined as an extra-length sheet, equal in length to the desired standard length plus the length of the necessary leading margin 3 (the length of the leading margin 3 will vary from printer to printer, but typically is about ½ to 2 inches, and is essentially constant for each type of printer). After an image is printed full-size in the image area 2 on the extra-length output sheet 1, the output sheet 1 is advanced forward out of the printer and cut a first time by the printer's paper trimmer to crop the leading margin 3. The output sheet 1 is then advanced forward again and cut a second time to crop the output sheet 1 to the desired standard length size. The result is a full-size image on a standard length output sheet 1.

Figure 2:
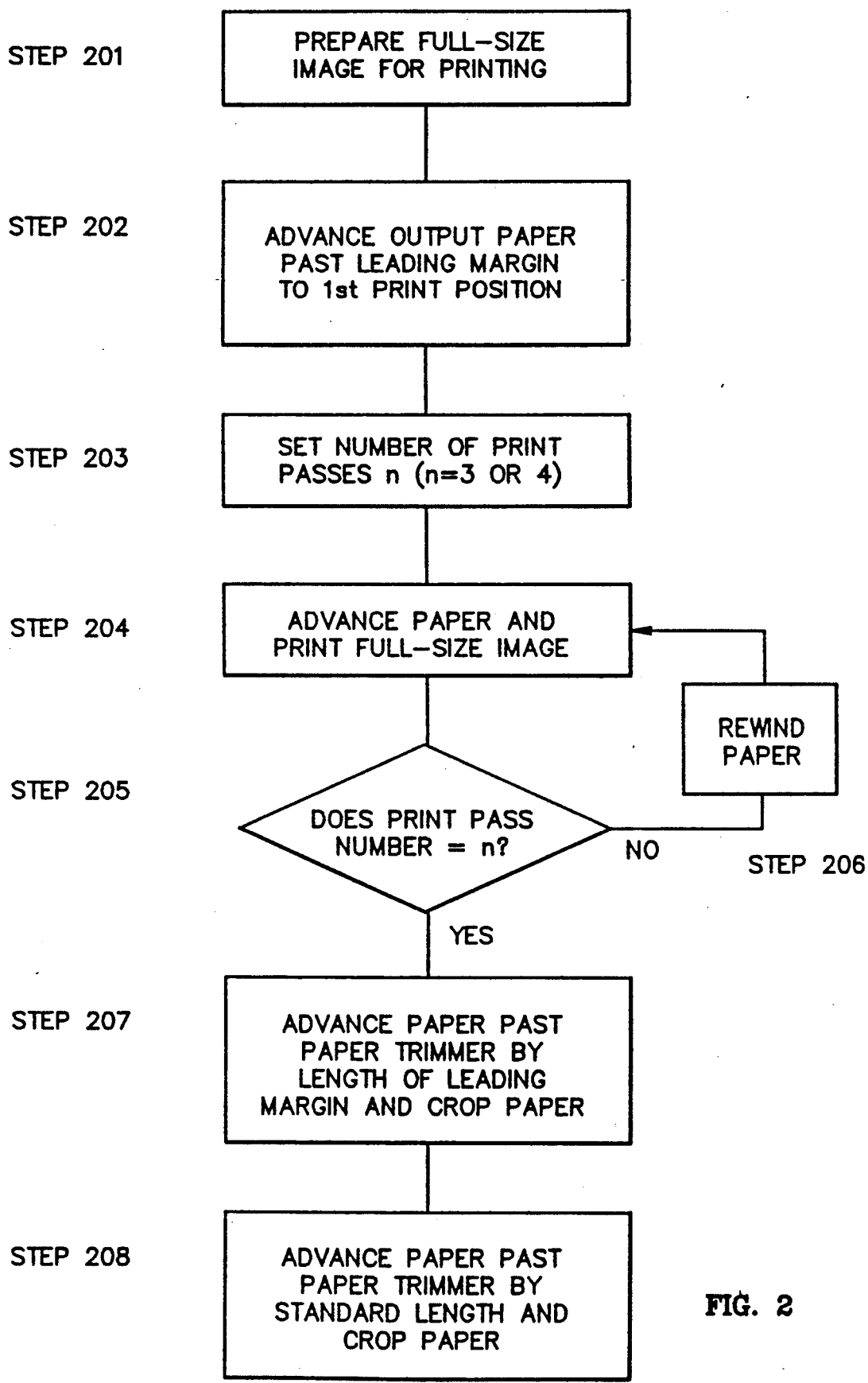
FIG. 2 is a flow chart setting forth the preferred embodiment of the inventive method.

FIG. 2 is a flow chart setting forth a preferred printer control procedure. In Step 201, a full-size image is prepared in known fashion for printing. In Step 202, paper from a paper roll is advanced past a leading margin such that printing will begin in the image area 2.

The number of print passes is set in the control means, either manually or automatically, in known fashion (Step 203). For typical color printing, the number of passes will usually be three (for cyan, yellow, and magenta colors) or four (for cyan, yellow, magenta, and black colors). (The setting of the number of print passes can be done at any time before printing starts, and in some cases can be altered during a printing run).

For each pass, the initial output sheet 1 is advanced past the printing mechanism, and a full-size image is printed in the image area 2 (Step 204).

If the total number of print passes has not occurred (Step 205), the output sheet 1 is "rewound" (i.e., moved backwards from the output direction) (Step 206) and another print pass is made (Step 204).

If the total number of print passes has occurred (Step 205), the output sheet 1 is advanced past the paper trimmer until only the leading margin is exposed. The leading margin 3 is then cropped. (Step 207).

Finally, the output sheet 1 is advanced past the paper trimmer by the standard output length desired (e.g., 11 inches or 14 inches), and the output sheet 1 is then cropped. (Step 208).

Since the inventive concept uses the existing components of available printers, the invention can be implemented by reprogramming a printer control means to (1) print a full-size image on an extra-length initial output sheet 1, (2) advance the extra-length output sheet 1 out of the printer, and (3) actuate the printer's paper trimming mechanism twice for each output sheet 1, first to crop the leading margin 3, and second to cut the output sheet 1 to a standard length.

The preferred embodiment of the present invention has been described. Nevertheless, various modifications may be made without departing from the spirit and scope of the invention. For example, the invention could be adapted for use with facsimile machines to crop output sheets to a standard size. Accordingly, the invention is not to be limited by the specific illustrated embodiment, but only by the scope of the appended claims.

I claim:

1. A method for printing a full-size image in a standard length output sheet in a printer having a printing mechanism, an integral paper trimming mechanism, a paper transport mechanism, and electronic control means for controlling the movement and trimming of output sheets from a roll of paper, comprising the steps of:
   a. advancing an initial length output sheet which is longer than the standard length output sheet from the paper roll so that the extra length of the initial length output sheet relative to the standard length output sheet constitutes a leading margin of the initial length output sheet and printing will begin in an image printing area on the initial length output sheet which is not part of the leading margin;
   b. printing a full-size image in the image printing area;
   c. trimming the leading margin with the paper trimmer;
   d. trimming the remainder of the initial length output sheet from the roll of paper with the paper trimmer to provide the standard length output sheet.

2. A method for printing a full-size image on a standard length output sheet in a printer having a printing mechanism, an integral paper trimming mechanism, a paper transport mechanism, and electronic control means for controlling the movement and trimming of output sheets from a roll of paper, comprising the steps of:
   a. preparing a full-size image for printing;
   b. advancing an initial length output sheet which is longer than the standard length output sheet from the paper roll so that the extra length of the initial length output sheet relative to the standard length output sheet constitutes a leading margin of the initial length output sheet and printing will begin in an image printing area on the initial length output sheet which is not part of the lading margin;
   c. printing a full-size image in the image printing area;
   d. advancing the lading margin of the initial length output sheet past the paper trimmer and trimming the lading margin with the paper trimmer;
   e. advancing the initial length output sheet past the paper trimmer and trimming the remainder of the roll of paper with the paper trimmer to provide the initial length output sheet.

3. An apparatus for printing a full-size image on a standard length output sheet, comprising:
   a. a printer having a printing mechanism and a supply of roll paper;
   b. a processor-controlled paper advancement means programmed to advance an initial length output sheet which is longer than the standard length output sheet from the paper roll so that the extra length of the initial length output sheet relative to the standard length output sheet constitutes a leading margin of the initial length output sheet and printing will begin in an image printing area on the initial length output sheet which is not part of the lading margin;
   c. means for printing a full-size image in the image printing area;
   d. a processor-controlled paper trimming means programmed to trim the lading margin and to trim the remainder of the initial length output sheet from the roll of paper to provide the standard length output sheet.

4. An apparatus for printing a full-size image on a standard length output sheet, comprising:
   a. a printer having a printing mechanism, a supply of roll paper, and a processor-controlled paper trimmer;
   b. a processor-controlled paper advancement apparatus programmed to advance an initial length output sheet which is longer than the standard length output sheet from the paper roll so that the extra length of the initial length output sheet relative to the standard length output sheet constitutes a leading margin of the initial length output sheet and printing will begin in an image printing area on the initial length output sheet which is not part of the leading margin;
   c. means for printing a full-size image in the image printing area;
   wherein the paper advancement apparatus is further programmed to advance the leading margin of the initial length output sheet past the paper trimmer and the paper trimmer is programmed to trim the leading margin; and
   wherein the paper advancement apparatus is further programmed to advance the remainder of the initial length output sheet past the paper trimmer and the paper trimmer is programmed to trim said remainder to provide the standard length output sheet.

* * * * *